United States Patent
Imaeda et al.

(10) Patent No.: US 9,713,979 B2
(45) Date of Patent: Jul. 25, 2017

(54) VEHICULAR HEADLAMP APPARATUS

(71) Applicants: DENSO CORPORATION, Kariya, Aichi-pref. (JP); TOYOTA JIDOSHA KABUSHIKI KAISHA, Toyota-shi, Aichi-ken (JP); KOITO MANUFACTURING CO., LTD., Tokyo (JP)

(72) Inventors: Koji Imaeda, Inazawa (JP); Hajime Kasai, Kariya (JP); Kiyotaka Mochizuki, Shizuoka (JP); Tatsuya Takagaki, Nisshin (JP)

(73) Assignees: DENSO CORPORATION, Kariya, Aichi-pref. (JP); TOYOTA JIDOSHA KABUSHIKI KAISHA, Toyota-shi, Aichi-ken (JP); KOITO MANUFACTURING CO., LTD., Tokyo (JP)

( * ) Notice: Subject to any disclaimer, the term of this patent is extended or adjusted under 35 U.S.C. 154(b) by 131 days.

(21) Appl. No.: 14/426,323

(22) PCT Filed: Aug. 23, 2013

(86) PCT No.: PCT/JP2013/072591
§ 371 (c)(1),
(2) Date: Mar. 5, 2015

(87) PCT Pub. No.: WO2014/038407
PCT Pub. Date: Mar. 13, 2014

(65) Prior Publication Data
US 2015/0251586 A1 Sep. 10, 2015

(30) Foreign Application Priority Data
Sep. 7, 2012 (JP) ................. 2012-197124

(51) Int. Cl.
*B60Q 1/12* (2006.01)
*B60Q 1/08* (2006.01)
*B60Q 1/14* (2006.01)

(52) U.S. Cl.
CPC ............... *B60Q 1/085* (2013.01); *B60Q 1/12* (2013.01); *B60Q 1/143* (2013.01);
(Continued)

(58) Field of Classification Search
CPC .... B60Q 1/12; B60Q 1/143; B60Q 2300/112; B60Q 2300/122; B60Q 2300/41
See application file for complete search history.

(56) References Cited

U.S. PATENT DOCUMENTS 7,210,828 B2 * 5/2007 Fukawa .................. B60Q 1/12
307/10.8
7,241,028 B2 * 7/2007 Hasumi .................... B60Q 1/12
315/82
(Continued)

FOREIGN PATENT DOCUMENTS

EP 2272714 A2 1/2011
EP 2394851 A2 12/2011
(Continued)

OTHER PUBLICATIONS

International Search Report (in Japanese with English Translation) for PCT/JP2013/072591, mailed Oct. 1, 2013; ISA/JP.
(Continued)

*Primary Examiner* — Julie Bannan
(74) *Attorney, Agent, or Firm* — Harness, Dickey & Pierce, P.L.C.

(57) ABSTRACT

A vehicular headlamp apparatus includes: a headlamp that illuminates ahead of a vehicle; light distribution pattern switching means for switching light distribution pattern of the headlamp between a plurality of light distribution pat-
(Continued)

terns which include, at least, a high beam and a low beam; detecting means for detecting a forward vehicle present in front of the vehicle; controlling means for controlling the light distribution pattern switching means based on a detection result of the detecting means; and turning radius acquiring means for acquiring a turning radius of the own vehicle during running. Moreover, when the turning radius of the own vehicle acquired by the turning radius acquiring means is less than a predetermined value, the controlling means inhibits the switching of the light distribution pattern of the headlamp to a higher side.

4 Claims, 4 Drawing Sheets

(52) U.S. Cl.
CPC .. *B60Q 2300/056* (2013.01); *B60Q 2300/122* (2013.01); *B60Q 2300/41* (2013.01)

(56) References Cited

U.S. PATENT DOCUMENTS

| | | | | |
|---|---|---|---|---|
| 2003/0227777 | A1* | 12/2003 | Schofield | B60Q 1/1423 362/460 |
| 2008/0112173 | A1* | 5/2008 | Dassanayake | B60Q 1/12 362/466 |
| 2011/0280026 | A1* | 11/2011 | Higgins-Luthman | B60Q 1/143 362/466 |
| 2012/0051071 | A1* | 3/2012 | Okubo | F21S 48/1159 362/465 |
| 2012/0203432 | A1* | 8/2012 | Lukacs | B60Q 1/0041 701/42 |

FOREIGN PATENT DOCUMENTS

| | | |
|---|---|---|
| EP | 2394852 A2 | 12/2011 |
| EP | 2657079 A2 | 10/2013 |
| JP | S62137242 A | 6/1987 |
| JP | 2009255639 A | 11/2009 |
| JP | 2011016505 A | 1/2011 |
| JP | 2011255825 A | 12/2011 |
| JP | 2011255826 A | 12/2011 |

OTHER PUBLICATIONS

Written Opinion for PCT/JP2013/072591, mailed Oct. 1, 2013; ISA/JP.
International Preliminary Report on Patentablity and Written Opinion (English Translation) mailed Mar. 19, 2015 for PCT/JP2013/072591; ISA/JP.

* cited by examiner

FIG.6

VEHICULAR HEADLAMP APPARATUS

CROSS REFERENCE TO RELATED APPLICATIONS

This application is a U.S. National Phase Application under 35 U.S.C. 371 of International Application No. PCT/JP2013/072591 filed on Aug. 23, 2013 and published in Japanese as WO 2014/038407 A1 on Mar. 13, 2014. This application is based on and claims the benefit of priority from Japanese Patent Application No. 2012-197124 filed on Sep. 7, 2012. The entire disclosures of all of the above applications are incorporated herein by reference.

TECHNICAL FIELD

The present invention relates to vehicular headlamp apparatuses.

BACKGROUND ART

Conventionally, there have been known high-beam variable headlamp systems (or Adaptive Driving Beam Systems) which, for improving safety during nighttime driving, illuminate portions other than forward vehicles (including preceding vehicles and oncoming vehicles) with a high beam, thereby securing the forward field of vision in a wide range.

Specifically, a high-beam variable headlamp system is a system which: detects the position of a forward vehicle by image-processing information from an in-vehicle camera; uses a light distribution pattern called "intermediate high beam" which shades a portion of an illumination range while illuminating the other portions with the high beam; and makes the shaded portion track the forward vehicle, thereby securing the forward field of vision of the own vehicle in a wide range and making it easy to find a pedestrian without causing glare to the forward vehicle.

Moreover, in Patent Document 1, there is disclosed: shading a portion of an illumination range by a shade mechanism provided in a headlamp; and switching the light distribution pattern of the headlamp automatically to a low beam in curves regardless of the presence or absence of a forward vehicle.

PRIOR ART LITERATURE

Patent Literature

[PATENT DOCUMENT 1] Japanese Patent Application Publication No. JP2011255826A

SUMMARY OF THE INVENTION

Problems to be Solved by the Invention

However, when the light distribution pattern is switched to the low beam in curves in spite of the absence of a preceding vehicle or an oncoming vehicle as disclosed in Patent Document 1, the forward field of vision may be narrowed, thereby causing fear to a driver of the own vehicle.

The present invention has been made in view of the above-described problems. It is, therefore, an object of the present invention to provide a vehicular headlamp apparatus which can secure the field of vision of the driver of the own vehicle as wide as possible while preventing the imposition of glare on a driver or a passenger of a preceding vehicle.

Means for Solving the Problems

According to the invention recited in Claim 1, which has been made for achieving the above object, a vehicular headlamp apparatus includes: a headlamp that illuminates ahead of a vehicle; light distribution pattern switching means for switching light distribution pattern of the headlamp between a plurality of light distribution patterns, the plurality of light distribution patterns including, at least, a high beam and a low beam; detecting means for detecting a forward vehicle present in front of the vehicle; and controlling means for controlling the light distribution pattern switching means based on a detection result of the detecting means. The invention is characterized in that: the vehicular headlamp apparatus further includes turning radius acquiring means for acquiring a turning radius of the own vehicle during running; and when the turning radius of the own vehicle acquired by the turning radius acquiring means is less than a predetermined value, the controlling means inhibits the switching of the light distribution pattern of the headlamp to a higher side.

With the above configuration, when the turning radius of the own vehicle is greater than or equal to the predetermined value, the forward vehicle is detected by the detecting means; based on the detection result, the light distribution pattern switching means is controlled by the controlling means. Consequently, it is possible to suitably set the light distribution pattern of the headlamp. On the other hand, when the turning radius of the own vehicle is less than the predetermined value, the switching of the light distribution pattern of the headlamp to the higher side is inhibited. Consequently, it is possible to secure the field of vision as wide as possible without causing a driver or a passenger of the forward vehicle to see glare.

EMBODIMENTS FOR CARRYING OUT THE INVENTION

Figure 1:
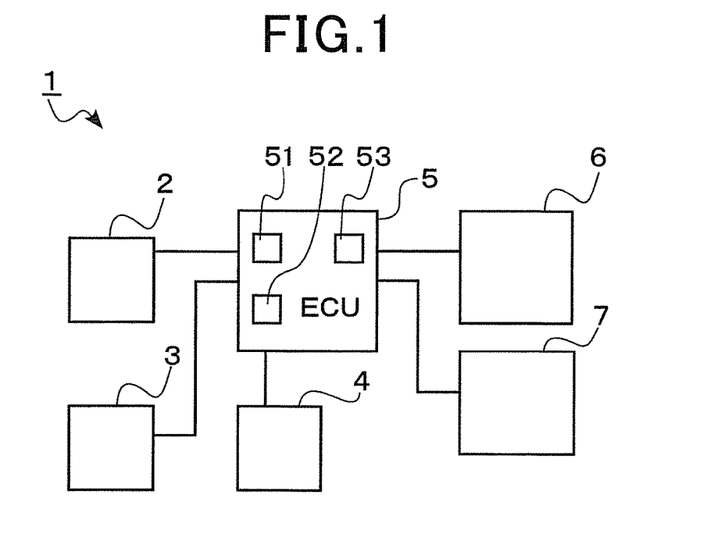
FIG. 1 is a functional block diagram illustrating the overall configuration of a vehicular headlamp apparatus according to an embodiment.

Hereinafter, a vehicular headlamp apparatus 1 according to an embodiment of the present invention will be described with reference to FIGS. 1-6. As shown in FIG. 1, the vehicular headlamp apparatus 1 includes an in-vehicle camera 2, a steering angle sensor 3, a wheel speed sensor 4, an ECU (Electronic Control Unit) 5 and headlamps 6 and 7.

The in-vehicle camera 2 is provided inside a front window of a vehicle. The in-vehicle camera 2 takes images ahead of the vehicle and sends the data to the ECU 5. The steering angle sensor 3 is an existing sensor for an ESC (Electronic Stability Control), which is provided in a steering mechanism. The steering angle sensor 3 senses a steering angle of the vehicle and sends a steering angle signal indicating the sensing results to the ECU 5. The wheel speed sensor 4 is an existing sensor provided for use in an ABS (Anti-lock Braking System). The wheel speed sensor 4 senses a rotational speed of a wheel of the vehicle and sends a wheel speed signal indicating the sensing results to the ECU 5.

The ECU 5 is a control unit for controlling the headlamps 6 and 7. Specifically, the ECU 5 has an image processing part 51, a turning radius acquiring part 52 and a controlling part 53. The image processing part 51 image-processes the data of the in-vehicle camera 2 and calculates the position of a preceding vehicle or an oncoming vehicle in the form of coordinates. The image processing part 51 also calculates swivel angles of the headlamps 6 and 7.

The turning radius acquiring part 52 calculates a turning radius of the vehicle based on the steering angle signal outputted from the steering angle sensor 3 and the wheel speed signal outputted from the wheel speed sensor 4. The controlling part 53 commands, based on the calculated turning radius of the vehicle, the headlamps 6 and 7 to perform the switching of light distribution patterns and a swivel operation.

Figure 2:
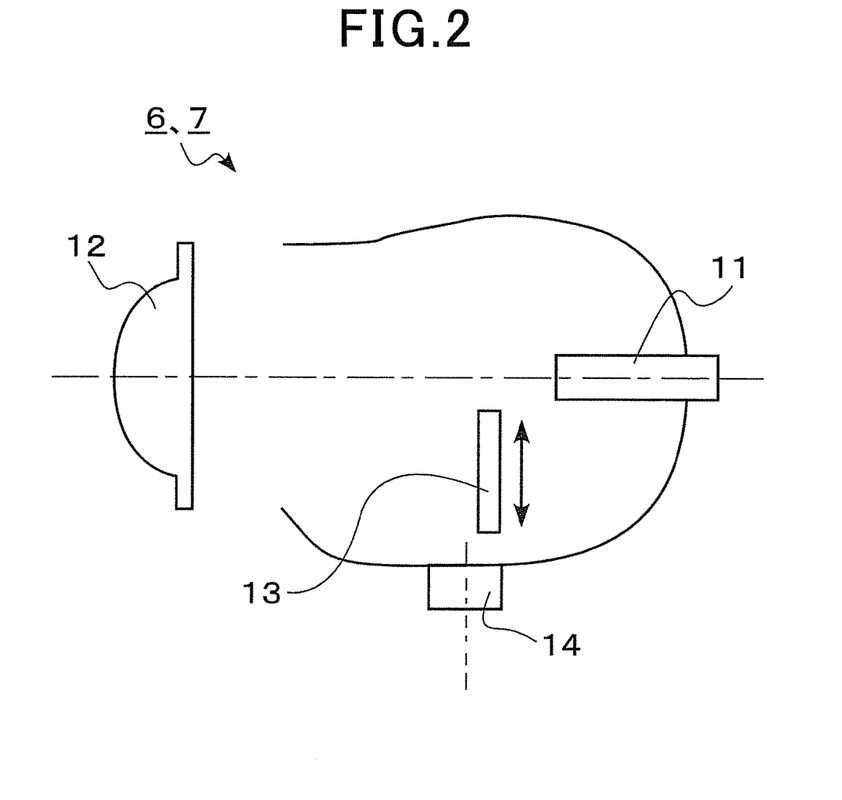
FIG. 2 is a schematic view of a headlamp.

The headlamps 6 and 7 are a pair of headlamps which are respectively provided on the left and right side of the vehicle to illuminate ahead of the vehicle. As shown in FIG. 2, each of the headlamps 6 and 7 includes a light source 11, a lens 12, a shade mechanism 13 and an actuator 14. The light source 11 is a halogen lamp. The shade mechanism 13 includes a plurality of not-shown shade plates. The shade mechanism 13 forms, according to a command from the controlling part 53 of the ECU 5, an intermediate high beam pattern and a low beam pattern by being inserted into part of an optical path formed in the headlamp to block light. Moreover, the shade mechanism 13 forms a high beam pattern by being completely retreated from the optical path. In addition, the headlamps 6 and 7 each have those three light distribution patterns.

Figure 3:
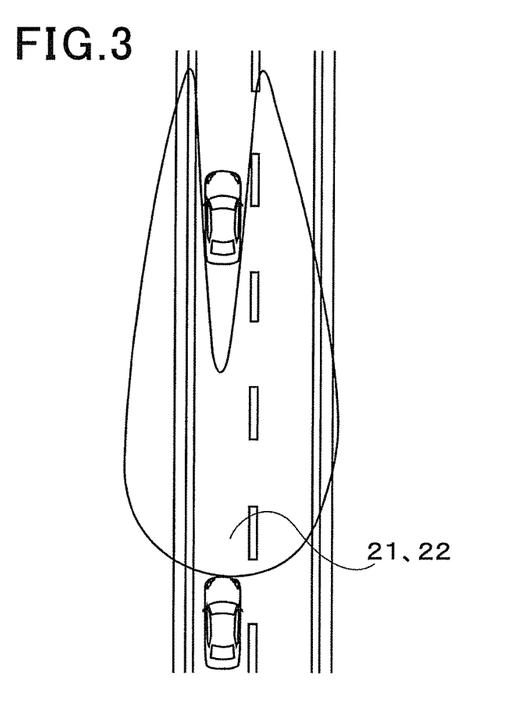
FIG. 3 is a schematic view showing the light distribution pattern of an intermediate high beam at a viewpoint from the upper side.
Figure 4:
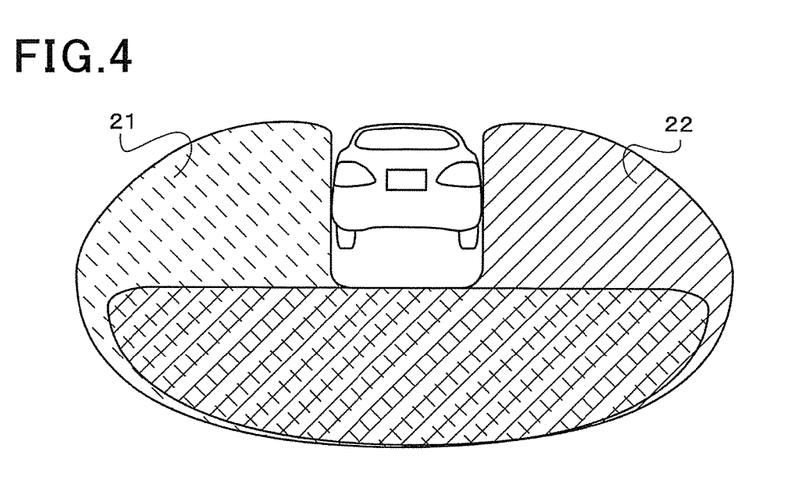
FIG. 4 is a schematic view showing the light distribution pattern of the intermediate high beam at a viewpoint from a driver's seat.

As shown in FIGS. 3-4, the intermediate high beam is a concave light distribution pattern which shades a portion corresponding to the forward vehicle so as not to cause glare to an occupant of the forward vehicle. The left headlamp defines an illumination range 21 which has a substantially L-shaped light distribution pattern. The right headlamp defines an illumination range 22 which has a light distribution pattern with a substantially mirror-reversed L-shape.

When the left and right headlamps form the intermediate high beam at the same time, a light distribution pattern as shown in FIGS. 3-4 is synthesized. Ideally, as shown in FIG. 4, it is preferable that the illumination ranges are positioned so that the positions of the left and right ends of the forward vehicle coincide with the positions of vertical cut lines of the illumination ranges. Therefore, the position of the forward vehicle is always checked and the headlamps are swiveled.

The intermediate high beam has the same brightness as the high beam except at the shaded portion. Therefore, if the intermediate high beam was indeliberately irradiated on the forward vehicle and the forward vehicle was an oncoming vehicle, the light would directly enter the eyes of the driver of the oncoming vehicle to cause the driver to see glare. Moreover, if the forward vehicle was a preceding vehicle, the light reflected by mirrors would enter the eyes of the driver of the preceding vehicle and/or brightly illuminate the compartment of the preceding vehicle, thereby making it difficult to check the outside situation. Therefore, to prevent above, in the case of switching the light distribution pattern of the headlamps from the high beam or the low beam to the intermediate high beam, it is necessary to have the swivel angles calculated.

In addition, the actual light distribution pattern is not left-right symmetric, but to illuminate the left side more. However, this is irrelevant to explanation of the present invention. Therefore, for the sake of simplicity, explanation is made on the assumption that the light distribution pattern is symmetric in each of the figures.

Moreover, the headlamps 6 and 7 can be switched, by a manual switch, to the high beam, the low beam or an ADB mode. In addition, here, ADB (Adaptive Driving Beam) denotes a high-beam variable headlamp system.

The high beam and the low beam are the same as the conventional ones. The left and right headlamps are switched at the same time to the high beam or the low beam. The ADB mode is an automatic switching mode, in which the controlling part 53 of the ECU 5 automatically sets the left and right headlamps to the high beam or controls the left and right headlamps individually to the intermediate high beam or the low beam.

At the position where the shade mechanism 13 inserts and removes the shade plates as shown in FIG. 2, the up-down and left-right relationship is inverted by the lens 12. Therefore, when the shade mechanism 13 covers the lower side of the optical path as shown in FIG. 2, the upper side of the illumination range is shaded. That is, by covering a predetermined lower part of the optical path, it is possible to realize the light distribution pattern as shown in FIGS. 3-4.

The actuator 14 drives, according to a command from the controlling part 53 of the ECU 5, the entire headlamp to swivel about an axis of rotation. Specifically, the actuator 14 drives, based on the dada from the in-vehicle camera 2, the headlamp to swivel so as to prevent that the illumination range defined by the intermediate high beam illuminates a forward vehicle to cause a driver or a passenger of the forward vehicle to see glare. At this time, a reference position of an optical axis of each headlamp is acquired using the command information (command values of swivel angles) from the controlling part 53 of the ECU 5 to the actuators 14 of the headlamps 6 and 7.

Figure 5:
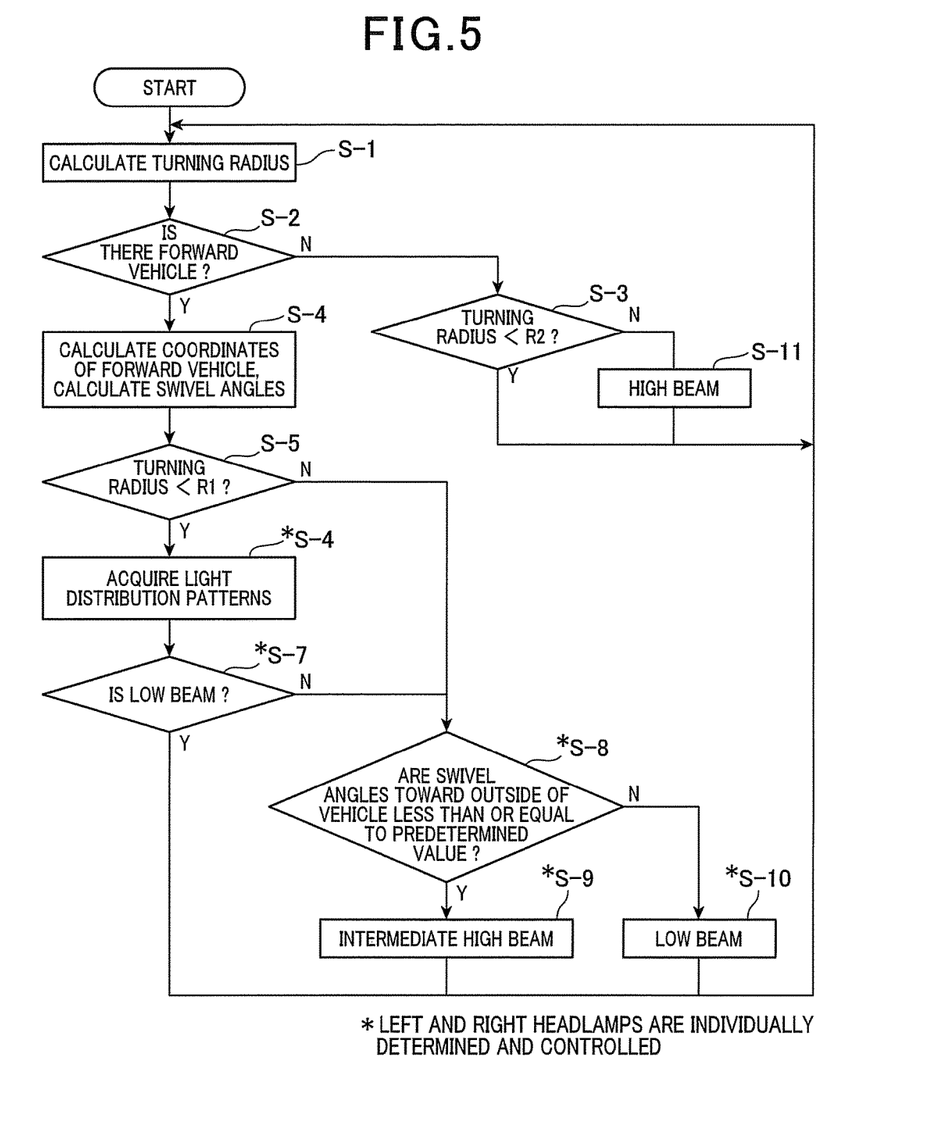
FIG. 5 is a flow chart illustrating a process of an ECU (Electronic Control Unit) for controlling the light distribution patterns of headlamps.

Next, the control and operation of the vehicular headlamp apparatus 1 according to the present embodiment will be described. The flow chart shown in FIG. 5 illustrates a process of the ECU 5 performed when the headlamps are set to the ADB mode and lit. Here, the initialization of data and initial processes such as a mode determination are omitted. The "START" in FIG. 5 represents a state where those initial processes have been completed.

First, the turning radius acquiring part 52 of the ECU 5 calculates, based on the steering angle signal outputted from the steering angle sensor 3 and the wheel speed signal outputted from the wheel speed sensor 4, the turning radius of the vehicle (step-1, abbreviated to S-1 hereinafter; other steps are also abbreviated in the same manner).

[In the Case where there is a Forward Vehicle]

Next, the controlling part 53 of the ECU 5 determines, based on the information from the in-vehicle camera 2, whether or not there is a forward vehicle (S-2). If there is a forward vehicle (S-2: YES), the image processing part 51 of the ECU 5 image-processes the information from the in-vehicle camera 2 and calculates the coordinates of both left and right ends of the forward vehicle based on, for example, the light of taillamps of a preceding vehicle or the light of headlamps of an oncoming vehicle. Moreover, the image processing part 51 calculates, based on the calculated coordinates, swivel angles for making the headlamps track the forward vehicle (S-4).

In addition, in the present embodiment, only when the light distribution patterns of the headlamps are the intermediate high beam, the headlamps are swiveled so as to track the position of the forward vehicle. However, at S-4, the calculation of the swivel angles is made regardless of the light distribution patterns of the headlamps. This is because the swivel angles are needed later for determining whether or not to switch the light distribution patterns from the low beam to the intermediate high beam at S-8 and for switching the light distribution patterns from the high beam to the intermediate high beam at S-9.

Next, at S-5, the controlling part 53 compares the turning radius calculated at S-1 with a predetermined value R1. Here, R1 is equal to 150[m]. In the light distribution control when there is a forward vehicle, curves having a turning radius greater than or equal to 150[m] are treated as being straight.

If the turning radius is less than the predetermined value R1 (S-5: YES), the current light distribution patterns of the headlamps 6 and 7 are acquired. The previous command signal to the headlamps 6 and 7, which is stored in the ECU 5, may be referred to. Consequently, it is possible to know which one of the high beam, the intermediate high beam and the low beam the current light distribution patterns are. The case of the turning radius being greater than or equal to the predetermined value R1 (S-5: NO) will be described later.

At subsequent S-7, it is determined whether or not the acquired light distribution patterns are the low beam. In addition, this determination is made for the left and right headlamps individually. If the light distribution patterns are the low beam (S-7: YES), the process returns to S-1.

The case of the light distribution patterns being not the low beam (S-7: NO), i.e., being the high beam or the intermediate high beam and the case of the turning radius being greater than or equal to the predetermined value R1 (S-5: NO) will be described. In those cases, for each of the left and right headlamps, a comparison is made between the swivel angle toward outside of the vehicle and a predetermined value. In addition, the case of the light distribution patterns being the high beam at S-7 is a case where the light distribution patterns are initially set to or kept at the high beam at S-11 since there is no forward vehicle and then the result of the determination at S-2 first becomes YES upon occurrence of a forward vehicle.

Figure 6:
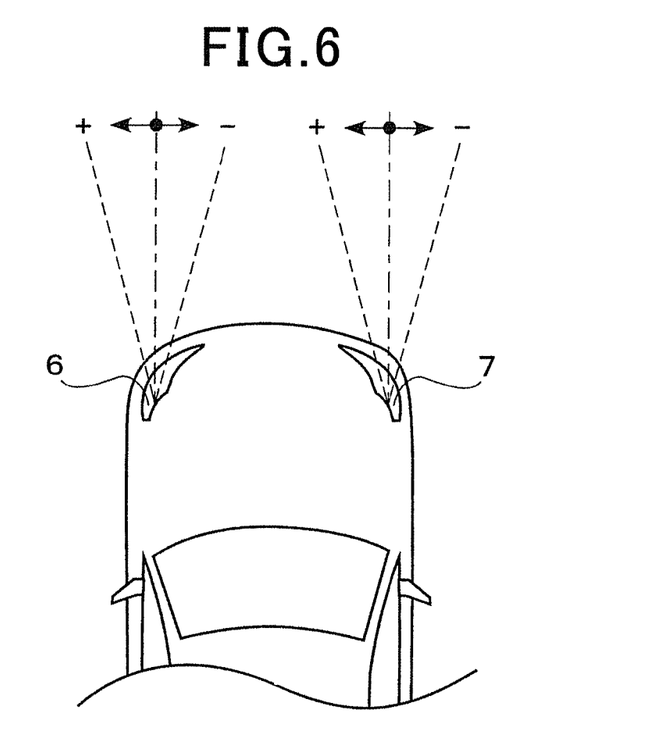
FIG. 6 is a schematic view illustrating swivel angles of the headlamps.

In the ECU 5, in relation to the image-processed coordinates, the swivel angles are processed with a sign assigned thereto as shown in FIG. 6. That is, let the angles indicating the vehicle front direction be zero, the angles inclined leftward be positive and the angles inclined rightward be negative. In addition, in FIG. 6, the left headlamp is designated by 6 and the right headlamp is designated by 7.

"SWIVEL ANGLES TOWARD OUTSIDE OF VEHICLE" written in the frame of S-8 in the flow chart denotes the swivel angle toward the positive side in the case of the left headlamp 6 and the swivel angle toward the negative side in the case of the right headlamp 7.

Accordingly, if the swivel angle of the left headlamp 6 is less than or equal to a positive predetermined value (S-8: YES), the light distribution pattern of the left headlamp 6 is set to or kept at the intermediate high beam (S-9). Moreover, if the swivel angle of the right headlamp 7 is greater than or equal to (or in absolute value less than or equal to) the predetermined value (S-8: YES), the light distribution pattern of the right headlamp 7 is set to or kept at the intermediate high beam (S-9).

Moreover, if the swivel angle of the left headlamp 6 is greater than the positive predetermined value (S-8: NO), the light distribution pattern of the left headlamp 6 is set to the low beam (S-10). Moreover, if the swivel angle of the right headlamp 7 is less than (or in absolute value greater) than the predetermined value (S-8: NO), the light distribution pattern of the right headlamp 7 is set to the low beam (S-10). In the low beam, the swiveling of making the headlamps track the forward vehicle is not performed, and thus the optical axes are returned to predetermined positions.

After S-9 and S-10, the process returns to S-1. In addition, in FIG. 6, if the swivel angle is toward inside of the vehicle, i.e., if the swivel angle is positive in the case of the right headlamp and negative in the case of the left headlamp, the switching of the light distribution patterns is not performed.

Explaining the present flow in the context of actual situation, even when there is no forward vehicle and thus the light distribution patterns are set to the high beam, if a forward vehicle appears, the light distributions are controlled so as to be switched to the intermediate high beam or the low beam. In this event, since the steps from S-1 to S-9, S10 are executed in a very short time, no glare will be felt by a driver or a passenger of the forward vehicle.

Moreover, in a curve where the turning radius is less than the predetermined turning radius, if the current light distribution patterns are low beam, they are kept at low beam. Consequently, no glare will be felt by the driver or a passenger of the forward vehicle.

Furthermore, in a curve where the turning radius is less than the predetermined turning radius, if the current light distribution patterns are the high beam or the intermediate high beam, they are controlled, according to the calculated swivel angles, so as to be switched to the intermediate high beam or the low beam. Consequently, it will be possible to secure the forward field of vision as wide as possible without causing the driver or a passenger of the forward vehicle to see glare.

[In the Case where there is No Forward Vehicle]

At S-2, if there is no forward vehicle (S-2: NO), the turning radius calculated at S-1 is compared with a predetermined value R2 (S-3). Here, R2 is equal to 100 [mm]. In the light distribution control when there is no forward vehicle, curves having a turning radius greater than or equal to 100[m] are treated as being straight.

If the turning radius is less than the predetermined value R2 (S-3: YES), the switching of the light distribution patterns is not performed and thus the current light distribution patterns are maintained; then, the process returns to S-1. If the turning radius is greater than or equal to the predetermined value R2 (S-3: NO), the light distribution patterns of the left and right headlamps are set to or kept at the high beam (S-11); then, the process returns to S-1.

Explaining in the context of actual situation, when the vehicle runs on a straight road (S-3: NO) without a forward vehicle (S-2: NO), the headlamps are controlled to the high beam (S-11). From this state, even if the vehicle enters a curve and the turning radius becomes less than the predetermined value R2 (S-3: YES), the light distribution patterns are kept at the high beam. Consequently, the forward field of vision will not be narrowed, contributing to safe driving.

Moreover, an explanation will be made of the characteristic process according to the present embodiment performed when the vehicle is brought, part-way through a curve, from the state where there is a forward vehicle (S-2: YES) into the state where there is no forward vehicle (S-2:

NO). In most cases where the vehicle runs on a straight road tracking a preceding vehicle (S-5: NO), the left and right headlamps are set to the intermediate high beam (S-8: YES, S-9).

Here, when the vehicle enters a curve, if there is a branch part-way through the curve and the preceding vehicle makes a left turn, it is highly probable that the right headlamp is kept at the intermediate high beam and the left headlamp is controlled to the low beam (S-8: NO, S10). Then, since the vehicle is brought into the state where there is no forward vehicle, in the next loop, S-2 will be NO and the turning radius will be compared with R2 (S-3).

At this time, if the turning radius is less than R2, even though there is no forward vehicle, the light distribution patterns will not be switched and thus will be maintained. For example, the right headlamp will be kept at the intermediate high beam, and the left headlamp will be kept at the low beam.

If the light distribution patterns were switched to the high beam part-way through the curve, the field of vision would be suddenly widened, causing the driver to feel uncomfortable. Moreover, in the curve, compared to a straight road, a forward vehicle would not enter the angle of view of the camera and thus could not be detected unless the forward vehicle is at a short distance from the vehicle. Therefore, with the detection state of a preceding vehicle or an oncoming vehicle being frequently changed, the switching of the light distribution patterns would be frequently performed; thus, it might feel bothersome. Accordingly, if the turning radius is less than R2, even though there is no forward vehicle, it is determined to maintain the previously-set light distribution patterns.

Since the current light distribution patterns are maintained in curves where the turning radius is less than the predetermined turning radius even when there is no forward vehicle, the driver of the own vehicle will feel neither uncomfortable nor bothersome.

Moreover, the predetermined value R2 is set to be less than the predetermined value R1. In the present embodiment, as described previously, the predetermined value R2 is equal to 100[m] and the predetermined value R1 is equal to 150[m]. In the case where there is no forward vehicle, no one would be caused to see glare and therefore the condition for raising the light distribution patterns to the high beam is relaxed in comparison with the case where there is a forward vehicle.

As described previously, even if a forward vehicle disappears part-way through a curve where the turning radius is less than R2, the vehicle will move to the exit of the curve with the light distribution patterns maintained. Upon arriving at the exit of the curve or a straight load, the turning radius will be increased. However, in this case, the absence of a forward vehicle will be determined based on long-range recognition by the in-vehicle camera 2. Therefore, the probability of the light distribution patterns being frequently switched will be lowered; thus it will be all right to allow the switching of the light distribution patterns in the condition that the turning radius is less than the predetermined value R1 used in the case where there is a forward vehicle (S-3: NO). Accordingly, the predetermined value R2 is set to be less than the predetermined value R1, and the light distribution patterns are raised early to the high beam at the exit of a curve if there is no forward vehicle, thereby prioritizing the widening of the field of vision.

As above, regardless of the presence or absence of a forward vehicle, in curves, the control is made not to switch the light distribution patterns to a higher side, but to at least maintain or switch to a lower side. In addition, "switching to a higher side" denotes the switching to a light distribution pattern of a wider illumination range, such as the switching from the intermediate high beam or the low beam to the high beam or the switching from the low beam to the intermediate high beam. Moreover, "switching to a lower side" denotes the switching to a light distribution pattern of a narrower illumination range, such as the switching from the intermediate high beam or the high beam to the low beam or the switching from the high beam to the intermediate high beam.

As made clear from the above explanation, according to the present embodiment, a vehicular headlamp apparatus includes: a headlamp (6, 7) that illuminates ahead of the vehicle; light distribution pattern switching means (the shade mechanism 13) for switching light distribution pattern of the headlamp between a plurality of light distribution patterns which include, at least, a high beam and a low beam; detecting means (the in-vehicle camera 2) for detecting a forward vehicle present in front of the vehicle; and controlling means (the controlling part 53) for controlling the light distribution pattern switching means based on a detection result of the detecting means. The apparatus further includes turning radius acquiring means (the turning radius acquiring part 52) for acquiring the turning radius of the own vehicle during running. When the turning radius of the own vehicle acquired by the turning radius acquiring means is less than a predetermined value, the controlling means inhibits the switching of the light distribution pattern to the higher side.

Moreover, according to the present embodiment, the turning radius acquiring means calculates the turning radius based on the steering angle signal outputted from the steering angle sensor 3 and the wheel speed signal outputted from the wheel speed sensor 4. With this configuration, it is possible to accurately calculate the turning radius.

Moreover, according to the present embodiment, the predetermined value includes a first predetermined value (R1) used for determination of the inhibition of the switching to the intermediate high beam and a second predetermined value (R2) which is different from the first predetermined value (R1) and used for determination of the inhibition of the switching to the high beam. Further, the second predetermined value (R2) is less than the first predetermined value (R1).

Moreover, according to the present embodiment, when the presence of a forward vehicle is detected by the detecting means, the controlling means sets, via the light distribution pattern switching means, the light distribution pattern of either of the left and right headlamps of the vehicle to the low beam or the intermediate high beam which is between the high beam and the low beam.

In addition, the present invention is not limited to the above-described embodiment and modification. It goes without saying that various changes may be made without departing from the spirit of the present invention.

For example, in the above embodiment, the explanation is made with respect to a preceding vehicle. However, by configuring the in-vehicle camera 2 to detect the light of headlamps of an oncoming vehicle, it is possible to similarly detect the left and right ends of the oncoming vehicle and apply the control of the above embodiment.

Moreover, the in-vehicle camera 2 may be implemented by an existing camera used for other purposes, such as one provided in a collision avoidance system.

In the above embodiment, the light sources of the headlamps are implemented by halogen lamps. However, the light sources of the headlamps may be implemented by LED lamps, HID lamps (HID is a registered trademark), or other types of light sources.

In the above embodiment, the reference position of the optical axis of each headlamp is acquired using the command information from the ECU 5 to the actuators 14 of the headlamps 6 and 7. However, the reference position may be acquired by image-processing the information from the in-vehicle camera 2 while supplementarily using the command information to the actuators 14.

In the above embodiment, the explanation is made on the premise that vehicles run on the left as in Japan and the U.K. However, the invention can also be similarly applied to cases where vehicles run on the right.

Moreover, at S-8, the predetermined value, to which the swivel angles are compared, may be set to different values for the right headlamp and the left headlamp. For example, the right headlamp may be set to or kept at the intermediate high beam when the swivel angle toward outside of the vehicle is less than or equal to 15[°]; the left headlamp may be set to or kept at the intermediate high beam when the swivel angle toward outside of the vehicle is less than or equal to 5[°].

In the above embodiment, the predetermined values R1 and R2, to which the turning radius is compared, are respectively set to 150[m] and 100[m]. However, the predetermined values R1 and R2 may be set to other values according to the type of the vehicle.

In the above embodiment, the pattern of the intermediate high beam is substantially L-shaped or substantially mirror-reversed L-shaped. However, the pattern of the intermediate high beam is not limited to those shapes and may have other shapes which have a shaded portion.

In the above embodiment, the turning radius is calculated based on the output signals of the steering angle sensor and the wheel speed sensor. However, the turning radius may be calculated based on information from an automotive navigation system or by image-processing white lines of roads.

DESCRIPTION OF REFERENCE SIGNS

1: vehicular headlamp apparatus
2: in-vehicle camera
6, 7: headlamps
13: shade mechanism
52: turning radius acquiring part
53: controlling part

The invention claimed is:

1. A vehicular headlamp apparatus comprising:
  a headlamp that illuminates ahead of a vehicle;
  light distribution pattern switching means for switching light distribution pattern of the headlamp between a plurality of light distribution patterns, the plurality of light distribution patterns including, at least, a high beam and a low beam;
  detecting means for detecting a forward vehicle present in front of the vehicle; and
  controlling means for controlling the light distribution pattern switching means based on a detection result of the detecting means,
  wherein
  the vehicular headlamp apparatus further comprises turning radius acquiring means for acquiring a turning radius of the own vehicle during running, and
  when the turning radius of the own vehicle acquired by the turning radius acquiring means is less than a predetermined value, the controlling means inhibits the switching of the light distribution pattern of the headlamp to a higher side,
  characterized in that
  the plurality of light distribution patterns include the high beam, the low beam and an intermediate high beam between the high beam and the low beam, and
  the predetermined value comprises a first predetermined value used for determination of the inhibition of the switching to the intermediate high beam and a second predetermined value used for determination of the inhibition of the switching to the high beam, the second predetermined value being different from the first predetermined value.

2. The vehicular headlamp apparatus as set forth in claim 1, further characterized in that
  the turning radius acquiring means calculates the turning radius based on a steering angle of the own vehicle detected by a steering angle sensor and a rotational speed of a wheel of the own vehicle detected by a wheel speed sensor.

3. The vehicular headlamp apparatus as set forth in claim 1, further characterized in that
  the second predetermined value is less than the first predetermined value.

4. The vehicular headlamp apparatus as set forth in claim 1, further characterized in that
  when the presence of the forward vehicle is detected by the detecting means, the controlling means sets, via the light distribution pattern switching means, the light distribution pattern of either of left and right headlamps of the vehicle to the low beam or the intermediate high beam.

* * * * *